United States Patent
Hagen et al.

(10) Patent No.: US 7,352,929 B2
(45) Date of Patent: Apr. 1, 2008

(54) ROTARY JOINT FOR DATA AND POWER TRANSFER

(75) Inventors: Bo S. Hagen, Marion, IA (US); Daniel L. Woodell, Cedar Rapids, IA (US); Jeffrey J. Deloy, Central City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/479,661

(22) Filed: Jun. 30, 2006

(65) Prior Publication Data
US 2008/0002934 A1    Jan. 3, 2008

(51) Int. Cl.
*G02B 6/26* (2006.01)

(52) U.S. Cl. .......................... 385/25; 385/26

(58) Field of Classification Search ............... 385/25, 385/26
See application file for complete search history.

(56) References Cited

U.S. PATENT DOCUMENTS

| | | | |
|---|---|---|---|
| 3,033,084 A | 5/1962 | Wheeler et al. ............ 235/401 |
| 3,611,367 A | 10/1971 | Billottet et al. ............... 343/6 |
| 3,935,572 A | 1/1976 | Broniwitz et al. ............ 343/9 |
| 4,529,986 A * | 7/1985 | d'Auria et al. ............. 342/433 |
| 4,901,080 A | 2/1990 | McHenry ..................... 342/1 |
| 4,940,987 A | 7/1990 | Frederick .................... 342/26 |
| 4,996,473 A | 2/1991 | Markson et al. ............ 324/72 |
| 5,136,295 A * | 8/1992 | Bull et al. ................... 342/15 |
| 5,140,289 A * | 8/1992 | Andrieu et al. ............ 333/256 |
| 5,187,768 A * | 2/1993 | Ott et al. .................... 385/140 |
| 5,198,819 A | 3/1993 | Susnjara |
| 5,633,963 A * | 5/1997 | Rickenbach et al. ......... 385/25 |
| 5,697,687 A * | 12/1997 | Coleman et al. ........... 353/122 |
| 5,945,926 A | 8/1999 | Ammar et al. |
| 6,201,494 B1 | 3/2001 | Kronfeld ..................... 342/26 |
| 6,236,376 B1 * | 5/2001 | Ors ........................... 343/882 |
| 6,285,878 B1 * | 9/2001 | Lai ............................ 455/431 |
| 6,452,668 B1 * | 9/2002 | Pratt ........................ 356/141.4 |
| 6,549,161 B1 | 4/2003 | Woodell ..................... 342/26 |
| 6,918,704 B2 * | 7/2005 | Marrs et al. .................. 385/78 |
| 7,042,397 B2 | 5/2006 | Charrier et al. ...... 343/700 MS |
| 7,187,823 B2 * | 3/2007 | Dimsdale et al. ............ 385/26 |
| 2005/0045760 A1 * | 3/2005 | Carlson .................... 244/1 TD |
| 2005/0279914 A1 * | 12/2005 | Dimsdale et al. ........... 250/205 |
| 2006/0139224 A1 | 6/2006 | Tietjen ....................... 343/757 |

OTHER PUBLICATIONS

Moog Components Group, Fiber Optic Rotary Joints, Product Guide, bearing a designation "© 2005 Moog Inc. MS 1071 Jan. 2006", 4 pages.
Moog Components Group, H18/H24 FORJ, bearing a designation "Oct. 2005", 2 pages.
Brown, Barry, "Slip Rings Go Digital", Motion System Design, bearing a designation "Jul. 2003" and "Copyright 2003 by Penton Media, Inc.", 3 pages.
U.S. Appl. No. 11/478,817, filed Jun. 30, 2006, Thompson et al.

* cited by examiner

*Primary Examiner*—Ellen E. Kim
(74) *Attorney, Agent, or Firm*—Nathan O. Jensen; Kyle Eppele

(57) ABSTRACT

A rotary joint is disclosed. The rotary joint comprise a power transfer interface for transferring power between a first portion having a first magnetic core and a second portion having a second magnetic core and rotatable relative to the first portion. The rotary joint may also comprise a data interface for transferring data between a cable and a second cable that is rotatable relative to the first cable.

20 Claims, 5 Drawing Sheets

ROTARY JOINT FOR DATA AND POWER TRANSFER

BACKGROUND

The present invention relates to a rotary joint for data and power transfer. More specifically, the present invention relates to a rotary joint for fiber optic data and power transfer for an aircraft weather radar system.

Moving power and signals around a rotary joint is generally known. Such known rotary joint designs combine fiber optic for data signals and slip ring for power into a combined module. However, such known rotary joints have several disadvantages including reduction in overall system reliability and availability because the durability and reliability of slip rings and brushes may not be suitable for certain applications (e.g., aircraft, aerospace, etc.). It is also known to use ribbon cable wound around the rotating axis to provide a data and power path. However, the reliability of using such ribbon cable is lower than desired and does not allow for 360 degree (continuous) rotation.

Accordingly, it would be advantageous to provide a rotating interface that does not require contact or a rigid connection for transmission of power and/or data. It would also be advantageous to combine fiber optic for data transmission and inductance (magnets) for power transmission across a rotary joint interface. Because magnets does not use brushes, durability and reliability are higher than the known slip ring approach. Because fiber optic cables are made of either glass or plastic, and joint interface housings are generally carbon fiber, it will not be affected by the strong magnetic field of the magnet. Thus, it would be desirable to provide for a rotary joint for data and power transfer having one or more of these or other advantageous features. To provide an inexpensive, reliable, and widely adaptable rotary joint for fiber optic data and power transfer that avoids the above-referenced and other problems would represent a significant advance in the art.

SUMMARY

The present invention relates to a rotary joint for data and power transfer. The rotary joint comprises a data interface for transferring data between a first cable and a second cable that is rotatable relative to the first cable; and a power transfer interface for transferring power between a first portion having a first magnetic core and a second portion having a second magnetic core and rotatable relative to the first portion.

The present invention also relates to a rotary joint for power transfer. The rotary joint comprises a power transfer interface for transferring power between a first portion having a first magnetic core and a second portion having a second magnetic core. The second portion core is rotatable relative to the first portion.

The present invention further relates to a radar system comprising an antenna mounting apparatus and an antenna rotatably coupled to the mounting apparatus by at least one rotary joint. The rotary joint comprises a data interface for transferring data between a first cable and a second cable that is rotatable relative to the first cable; and a power transfer interface for transferring power between a first magnetic core and a second magnetic core that is rotatable relative to the first magnetic core and spaced apart from the first magnetic core.

The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the claims which follow.

DETAILED DESCRIPTION OF PREFERRED AND EXEMPLARY EMBODIMENTS

Figure 1:
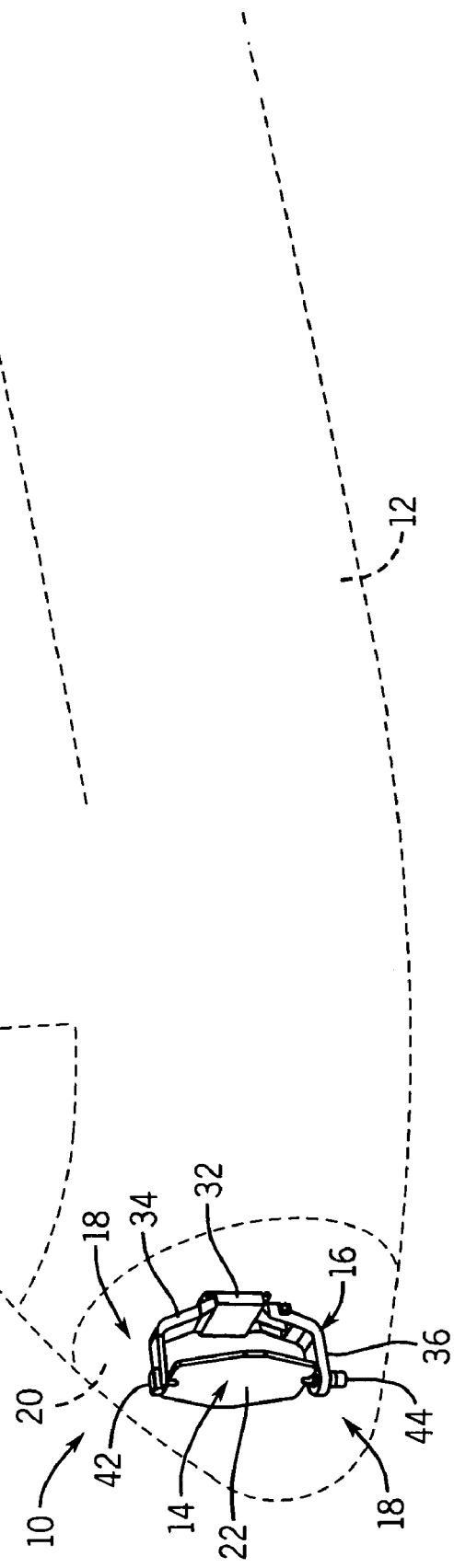
FIG. 1 is a perspective fragmentary view of an aircraft with a radar system.

FIG. 1 shows a radar system 10 mounted on a forward or front portion (nose) of an aircraft 12. Radar system 10 may be any of a variety of radar systems, including weather, wind shear, turbulence, micro-bursts, airborne obstacles, ground (e.g., runway) obstacles or the like or combinations thereof. Radar system 10 includes, among other components, an antenna 14, an antenna mounting apparatus 16, one or more rotary couplings or joints 18 connecting antenna 14 to mounting apparatus 16, and a shell 20 (generally referred to as a "radome") that encloses antenna 14 and mounting apparatus 16. Radar system 10 also includes a control system, user interface, including a display, keyboard/buttons, for the user or pilot to view the radar information or exert control over its operation. Rotary joint 18 allows transfer of data and power between antenna 14 and other radar components or aircraft systems without a direct connection or contact between the sides of the interface. Although rotary joint 18 is shown for use with a radar system, a person having ordinary skill in the art would understand that the rotary joint may be used in other applications where data and power are transferred between a rotational interface.

Antenna 14 is configured to transmit and receive radar signals. Antenna 14 includes a panel 22, transmitter/receiver module (not shown) coupled to panel, and an electronic module (not shown). Panel 22 (which is also generally referred to as a flat plate radiator) includes a first side that functions as a mechanical waive guide array and includes a plurality of wave guide channels (or grooves, apertures, or other structure) to form and emit the electronic scan (i.e., beam or beams).

Antenna mounting apparatus 16 (e.g., base, pedestal, yoke, frame, fixture, bracket structure, etc.) is configured to provide structural support to antenna 14 and may provide structural support to other components of radar system 10.

Mounting apparatus 16 includes a base 32, an upper arm 34, and a lower arm 36. Base 32 is coupled to a forward bulkhead of aircraft 12. Upper arm 34 (e.g., support member, beam, portion, etc.) extends from base 32 and includes a first end coupled to base 32 and a second end coupled to a top portion of antenna 14 by a shaft (e.g., axle, rod, pin, etc.). Lower arm 36 (e.g., support member, beam, portion, etc.) extends from base 32 and includes a first end coupled to base 32 and a second end coupled to a bottom portion of antenna 14 by a shaft 40 (e.g., axle, rod, pin, etc.). According to an exemplary embodiment, a lightning sensor 42 is coupled to upper arm 34. A motor 44 is mounted to lower arm 36 to rotate antenna 14.

Referring to FIGS. 2-6, rotary joint 18 is configured to provide transmission of data and power across a connection or coupling where one portion rotates relative to the other portion (i.e., antenna 14 rotating relative to arms 36 and/or 38 of mounting apparatus 16). As used in this description, the terms "fixed" and "rotating" or "rotatable" encompass embodiments where the rotary joint has a non-rotating side (or portion) and a rotating side (or portion) as well as where the rotary joint has one side that rotates at a different speed than the other side such that, there is a "relative" rotation between the sides of the joint, and will be generally referred to as a "fixed" side 50 and a rotatable side 52. Rotary joint 18 comprises a power interface 54, a data interface 56 (shown as a fiber optic interface), and a housing 58 to contain the data and power interfaces 54, 56.

Power interface 54 is configured to transfer power between fixed side 50 of rotary joint 18 and rotatable side 52 of rotary joint 18. Power interface 54 is provided by an inductor in the form of a transformer comprised of a first or "fixed" core 60 with a first coil winding (primary coil 62), and a second or "rotatable" core 64 with a second coil winding (secondary coil 66) that rotates relative to fixed core 60. A voltage applied to primary coil 62 induces a voltage in secondary coil 66 whether rotary joint 18 is static or is rotating. The voltage induced in secondary coil 66 may be increased or decreased relative to the voltage applied to primary coil 62 by the turns ratio of primary coil 62 verses secondary coil 66.

Fixed core 60 is spaced apart from rotatable core 64 to provide the desired electrical performance. A shim or spacer 68 is located between fixed core 60 and rotatable core 64 to provide and maintain a desired minimum gap or space between the cores, to provide a low friction interface, and/or to prevent the cores from directly contacting each other. According to a preferred embodiment, spacer 68 comprises a disc made from a low friction non-conductive material such as mylar, Teflon, or the like. Fixed and rotatable cores 60, 64 both include a projection 70 (e.g., rib, ledge, ridge, etc.) that extends into the gap and toward the other core to retain the spacer 68. Alternatively, only one of the cores may have the projection for retaining the spacer. According to exemplary embodiments, cores are made from any of a variety of magnetic materials. According to a preferred embodiment, the cores are made from a powered ferrite material formed into the desired shape.

Figure 2:
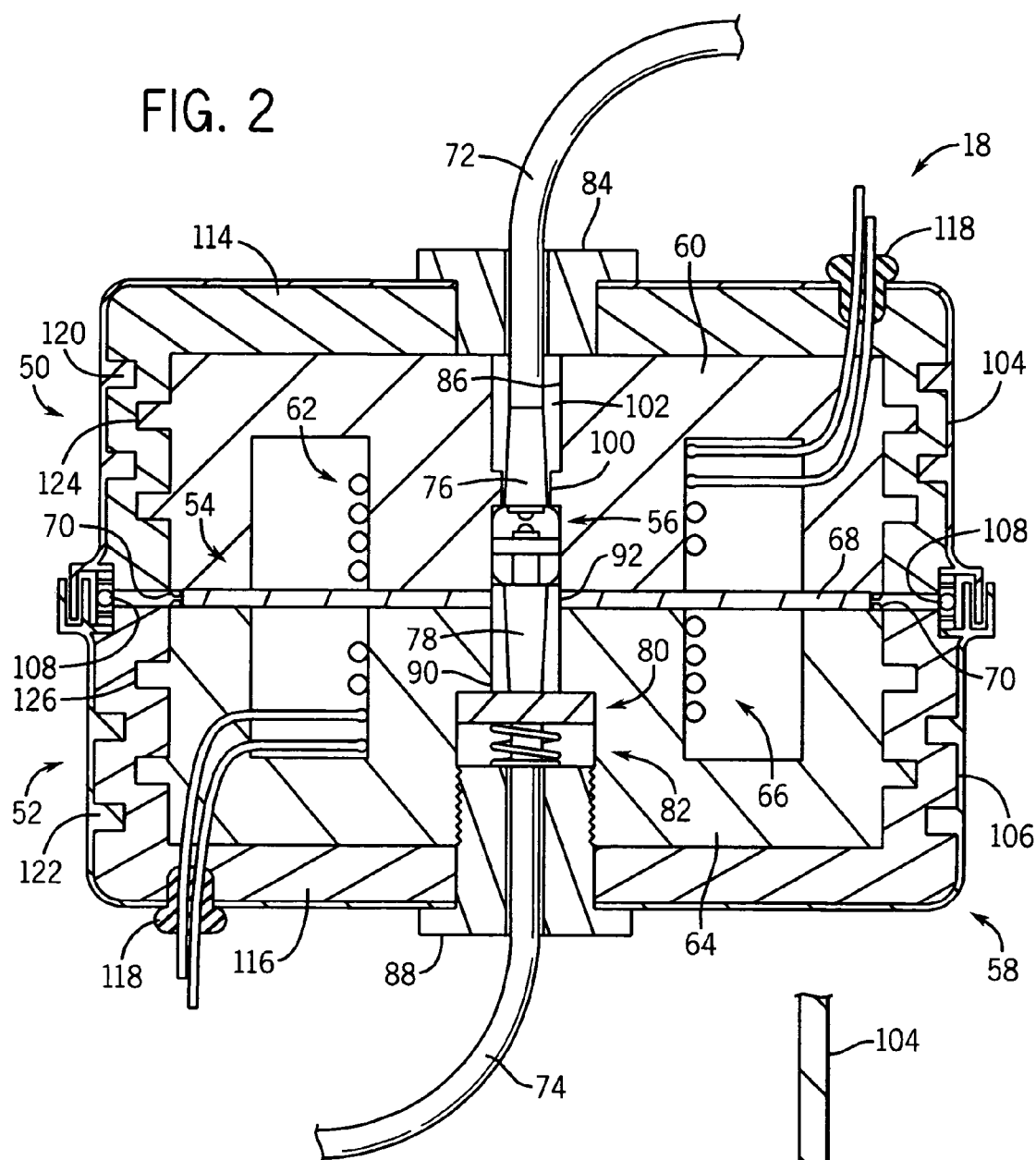
FIG. 2 is section view of a rotary joint that has a data and a power interface for the radar system of FIG. 1.
Figure 3:
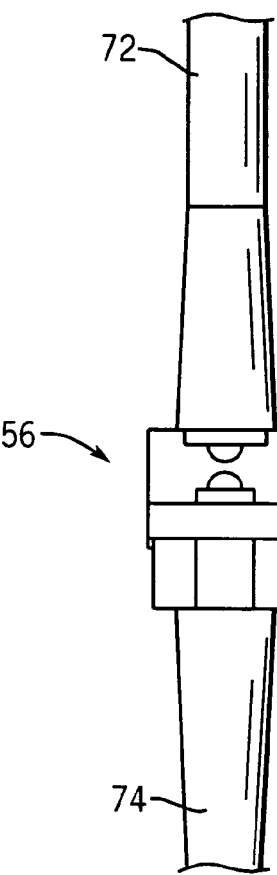
FIG. 3 is a fragmentary view of a fiber optic interface.

Referring to FIGS. 2 and 3, data interface 56 is configured to transfer data between a first or "fixed" input (shown as a cable 72) and a second or "rotatable" input (shown as a cable 74), which is rotatable relative to fixed cable 72. As shown in the figures, fixed and rotatable cables 72, 74 are fiber optic cables that work as transmitters and receivers of data across the interface. According to alternative embodiments, the type of data transfer may be done by any of a variety of technologies that allow for non-contact information or data exchange or transfer. Data interface 56 comprises opposing ends 76, 78 of cables 72, 74, a locking mechanism 80, and a biasing mechanism 82. End 76 of fixed cable 72 extends through a connector 84 (shown as a retaining bolt with an aperture through its central axis) and through an aperture 86 in fixed core 60. As shown in the exemplary embodiment, rotatable cable 74 extends through a connector 88 (shown as a retaining bolt with an aperture through its central axis), through an aperture 90 in rotatable core 64, through an aperture 92 in spacer 68, and into fixed core 60. According to alternative embodiments, the fixed cable may extend into the rotatable core (the opposite configuration as schematically illustrated), the interface may be located at the parting line between the fixed side and the rotatable side, or the like.

Figure 4:
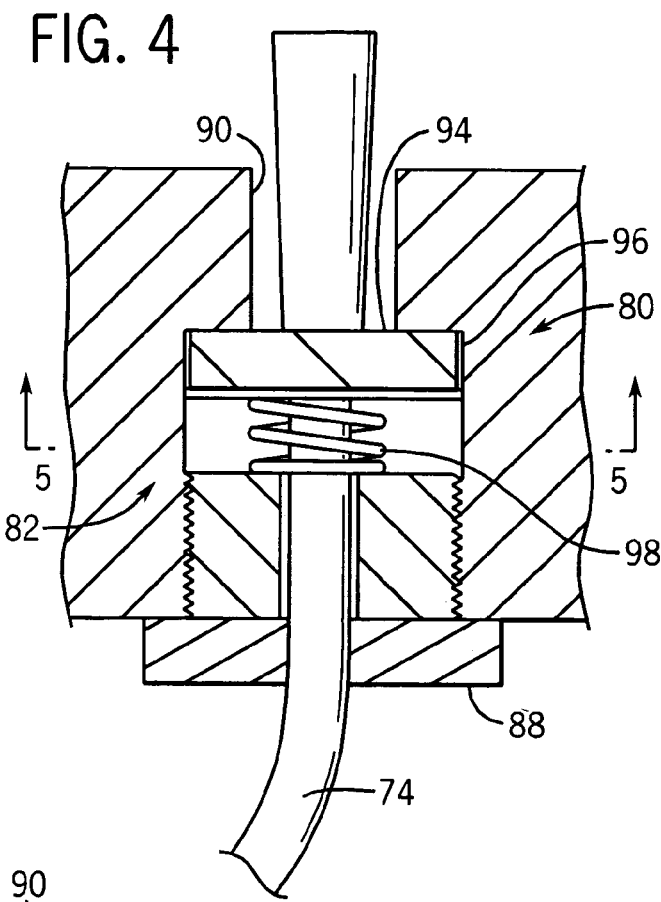
FIG. 4 is a fragmentary section view of the fiber optic interface.
Figure 5:
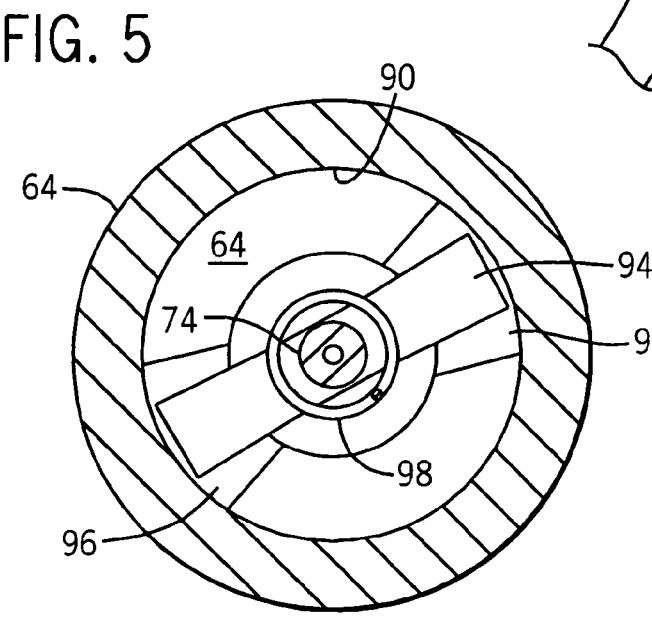
FIG. 5 is a section view of the fiber optic interface of FIG. 4 taken along line 5-5.

Referring to FIGS. 2, 4 and 5, locking mechanism 80 comprises a lock member 94 coupled to end 78 of rotatable cable 74. Locking member 94 is shown to be generally rectangular with ends that extend into recesses 96 in rotatable core 64. As such, rotation of cable 74 causes locking member 94 to engage walls of recesses 96 in rotatable core 64 and imparts rotation to rotatable side 52 relative to the fixed side 50. According to an exemplary embodiment, recesses 96 in rotatable core 64 are larger than locking member 94 to provide a clearance fit and to allow locking member 94 to rotate slightly before engaging a wall of recess 96. According to alternative embodiments, the locking member may be rigidly coupled to the rotating core (e.g., with an adhesive, interference fit, interconnecting geometries, etc.), or be any of a variety of shapes and sizes to engage one or more recesses in the rotatable core. In yet further alternative embodiments, the locking mechanism may be located in the fixed side of the coupling.

Referring to FIGS. 2, 4 and 5, biasing mechanism 82 is configured to bias rotatable cable 74 toward fixed cable 72 to reduce or minimize insertion loss and to allow differential vertical movement between the two sides of data interface 56 with only minimal changes in the distance between the ends 76, 78 of cables 72, 74. According to an exemplary embodiment, biasing mechanism 82 comprises a spring 98 disposed between locking member 94 and connector 88. Locking mechanism 80 is configured to prevent spring 98 from rotating, which may cause undesirable fiber optic performance and failure of the spring 98 due to excessive wear is added. According to an alternative embodiment, the bias or the spring loading is provided to the fixed side of the rotary joint. According to an exemplary embodiment, fixed cable 72 is secured in place by being engaged by a projection 100 extending into central aperture 86 in fixed core 60, and is non-rotatably connected to the fixed core 60 by an adhesive 102 (or resin, etc.).

Figure 6:
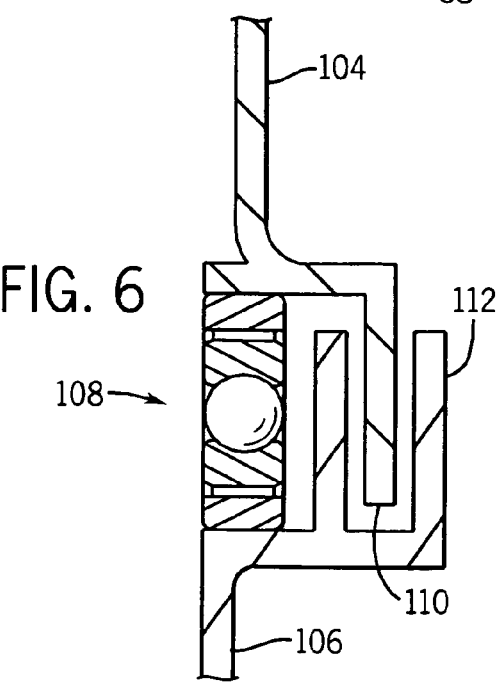
FIG. 6 is a fragmentary section detail view of the interface of the rotary joint.

Referring to FIGS. 2 and 6, housing 58 (e.g., casing, cover, covering, shell, cup, etc.) encloses the data interface 56 and power interface 54. Housing 58 comprises a first or fixed housing section 104 and a second or rotatable housing section 106 rotatably coupled or engaged with the fixed section 104. Each housing section 104, 106 is shaped to receive the respective cores 60, 64 and includes an aperture for cables and an aperture for wires extending from the respective primary and secondary coils. A bearing (shown as a ball bearing 108) is located between the fixed housing 104 and rotatable housing 106 to guide the rotation of, and reduce friction between, the fixed side 50 and the rotatable side 52. According to an exemplary embodiment, housing sections 104, 106 are made from a non-metallic and non-magnetic material such as carbon fiber, polymer, or the like.

It is known that EMI emissions are most prevalent in the gap between two cores 60, 64. To reduce or minimize these EMI emissions leaking through housing 58, an interlocking engagement is provided between housing section where the gap between the two cores is located. This will substantially reduce the magnitude of the EMI emission and enable the product that rotary joint is used on to meet EMI requirements. As best shown in FIG. 6, the peripheral edge of fixed housing section 104 includes a flange 110 that engages, and is received in, a channel 112 on the peripheral edge of rotatable housing section 106. Dimensions of flange 110 and channel 112 are selected to provide the desired path (dimension) to reduce electromagnetic interference (EMI) leakage. Alternatively, the flange may extend from the rotatable housing section and the channel may be located on the fixed housing section.

Referring again to FIG. 2, fixed core 60 is at least partially encapsulated by a resin 114. Similarly, rotatable core 64 is at least partially encapsulated by a resin 116. Lead wires from coils 62, 66 extend through and are held secure to resin and housing by grommets 118. Encapsulating or potting of cores 60, 64 in resin 114, 116 is used to improve performance and provide protection (e.g., dimensional stability, thermal cooling, EMI leakage insulation, environment protection, insulation, vibration/sound dampening, etc.). According to a preferred embodiment, fixed section 104 of housing 58 include projections 120, rotatable section 106 of housing 58 include projections 122, fixed core 60 includes projections 124, and rotatable core 64 includes projections 126 to form a mechanical bond with resin 114, 116. To prevent non-desirable variation in the power between the fixed and rotating sides 50, 52, the gap between the two cores is preferably tightly controlled. Resin 114, 116 and projections 120, 122, 124, 126 are intended to prevent movement of cores 60, 64 after installation in housing 58 and during use. According to a preferred embodiment, resins 114, 116 are an adhesive. According to a preferred embodiment, resin 114, 116 is an epoxy adhesive. According to alternative embodiments, any of a variety of resins with desirable thermal, adhesion, and magnetic properties may be used.

Figure 7:
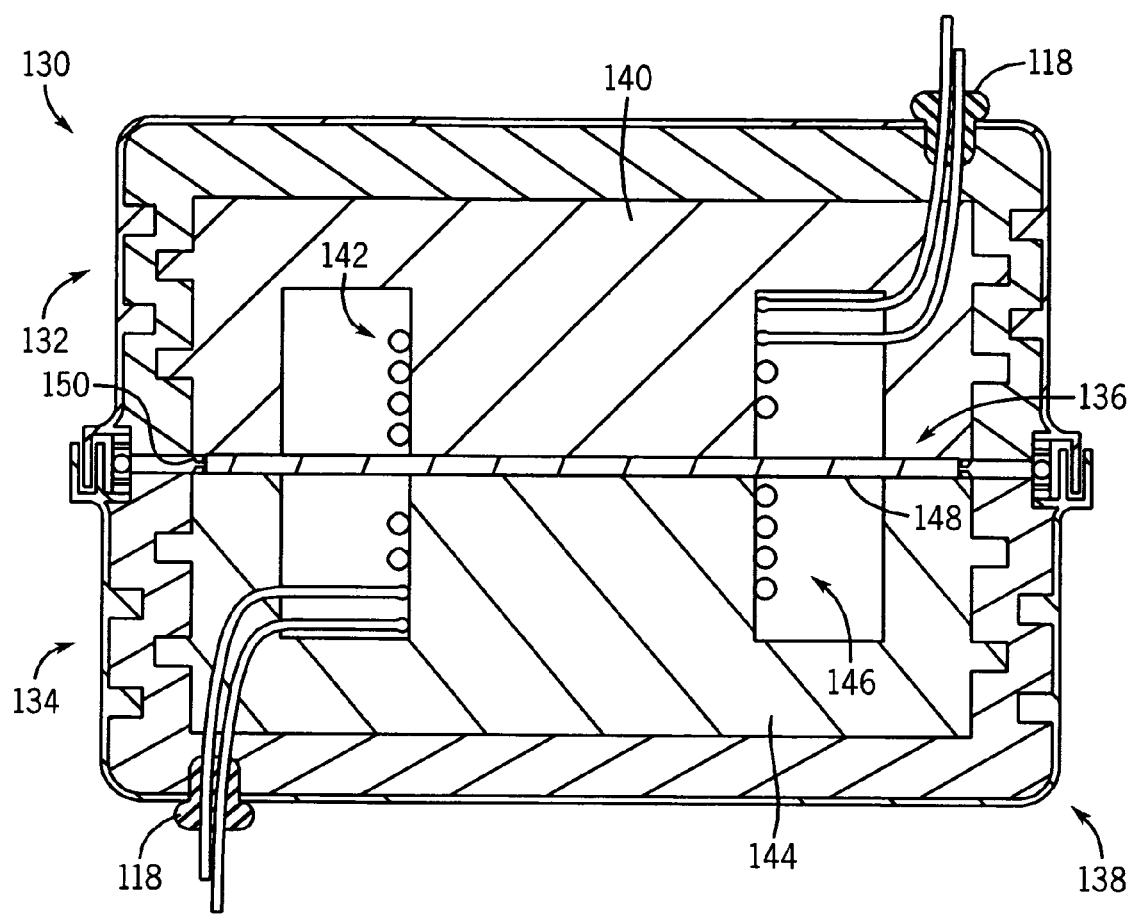
FIG. 7 is a section view of a rotary joint that has a power interface according to an alternative embodiment.

FIG. 7 is a section view of a rotary joint 130 according to an alternative embodiment. Rotary joint 130 is configured to provide transmission of power across a connection or coupling where one portion rotates relative to the other portion (i.e., antenna 14 rotating relative to arms 36 and/or 38 of mounting apparatus 16)—between a fixed side 132 and a rotatable side 134. Rotary joint 130 is similar to rotary joint 18 except it does not include a data interface. Rotary joint 130 comprises a power interface 136 located within a housing 138.

Power interface 136 is configured to transfer power between the fixed side 132 of rotary joint 130 and rotatable side 134 of rotary joint 130. Power interface 136 is provided by an inductor in the form of a transformer comprised of a first or "fixed" core 140 with a primary coil 142, and a second or "rotatable" core 144 with a secondary coil 146 that rotates relative to fixed core 140. A spacer 148 is located between fixed core 140 and rotatable core 144 to provide and maintain a desired minimum gap or space between the cores, to provide a low friction interface, and/or to prevent the cores from directly contacting each other. Fixed and rotatable cores 140, 144 both include a projection 150 that extends into the gap and toward the other core to retain spacer 148. Alternatively, only one of the cores may have the projection for retaining the spacer.

Figure 8:
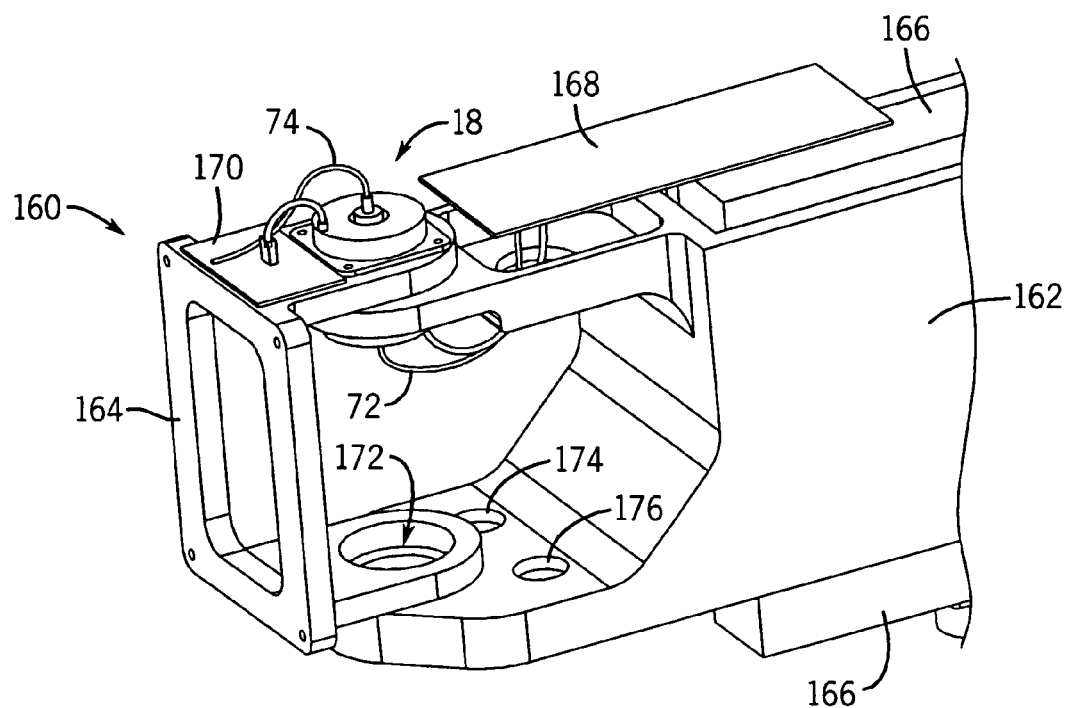
FIG. 8 is a top perspective fragmentary view of a rotary joint for a radar system according to an exemplary embodiment.
Figure 9:
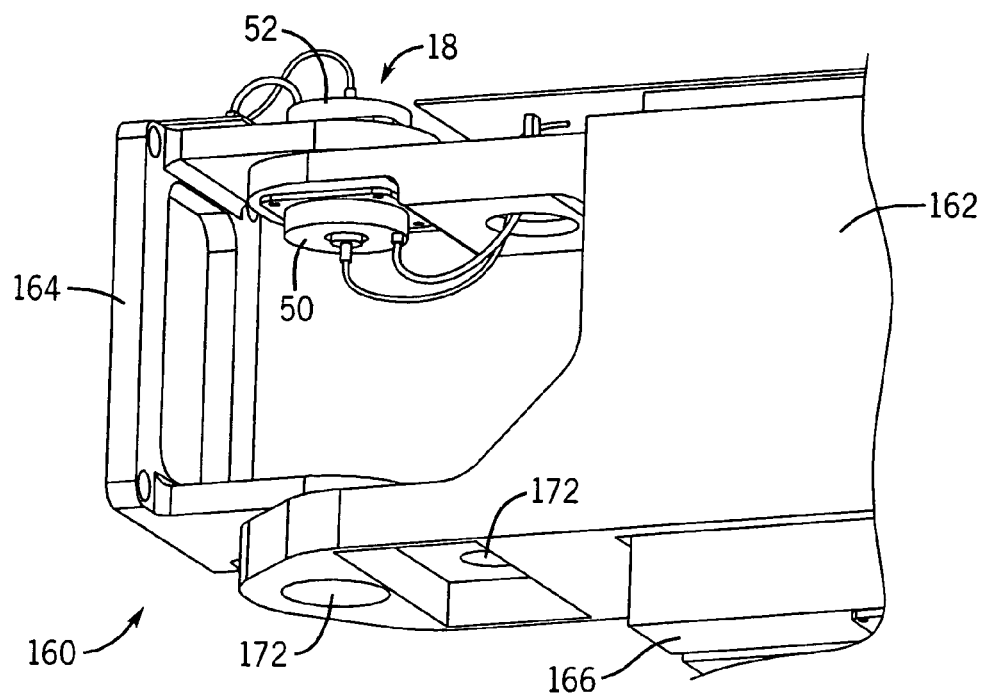
FIG. 9 is a bottom perspective fragmentary view of the rotary joint of FIG. 8.

FIGS. 8 and 9 show an apparatus 160 with a rotary joint 18 used in an application where power and data are being transmitted between one portion of the apparatus that is rotating relative to another portion of the apparatus. An example of such an apparatus and application is a mounting apparatus for an aircraft radar system. Apparatus 160 comprises a pedestal or base 162 coupled to a bulkhead of an aircraft, an antenna mounting bracket 164 (structure, member, frame, etc.) rotatably coupled to base 162, and rotary joint 18 that provides an interface between base 162 and antenna mounting bracket 164. Apparatus 160 further comprises an electronics module 166, a main communications circuit 168, and an antenna circuit 170—between which rotary joint transfers data and power across the rotating coupling. A motor (not shown) is coupled between base 162 and mounting bracket 164 at apertures 172, 174, 176.

While the components of the disclosed embodiments will be illustrated as an rotary joint for (fiber optic) data and power transfer designed for a weather radar system, the features of the disclosed embodiments have a much wider applicability. For example, the rotary joint for data and power transfer and mounting arrangement design is adaptable for other radar systems for aircraft, vehicles, stationary installations where it is desirable to minimize space. Alternatively, the rotary joint may be used in any of a variety of applications where it is desirable to provide data and power across a rotating or pivoting joint. Further, it is important to note that the terms "fixed," "rotating," and "rotatable" are intended to be broad terms and not terms of limitation. These components may be used with any of a variety of devices or arrangements and are not intended to be limited to use with radar applications.

It is also important to note that the construction and arrangement of the elements of the rotary joint for fiber optic data and power transfer as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A rotary joint for data and power transfer comprising:
   a data interface for transferring data between a first cable and a second cable that is rotatable relative to the first cable;
   a power transfer interface for transferring power between a first portion having a first magnetic core and a second portion having a second magnetic core and rotatable relative to the first portion; and
   a lock member coupled to the second cable and extending into one or more recesses in the second magnetic core, wherein rotation of the second cable causes the locking member to engage the second magnetic core to rotate the second portion relative to the first portion.

2. The rotary joint of claim 1 wherein the first cable is a first fiber optic cable and the second cable is a second fiber optic cable, flier comprising a biasing mechanism configured to bias at least one of the first fiber optic cable or the second fiber optic cable toward the other of the first fiber optic cable or the second fiber optic cable.

3. The rotary joint of claim 2 wherein the biasing mechanism comprises a spring.

4. The rotary joint of claim 1 wherein the locking member is generally rectangular with ends that extend into the one or more recesses in the second magnetic core.

5. The rotary joint of claim 1 wherein the one or more recesses are larger than the locking member to provide a clearance fit and to allow the locking member to rotate slightly before engaging the one or more recesses.

6. The rotary joint of claim 1 further comprising a first housing and a resin to at least partially encapsulate the first cable and the first magnetic core, and further comprising a second housing and resin to at least partially encapsulate the second cable and the second magnetic core.

7. The rotary joint of claim 6 wherein the first magnetic core, the second magnetic core, the first housing, and the second housing include projections to engage the resin.

8. The rotary joint of claim 7 wherein the resin is an adhesive.

9. The rotary joint of claim 6 further comprising a ball bearing located between the first housing and the second housing.

10. The rotary joint of claim 6 wherein the first housing includes a flange and the second housing includes a channel to receive the flange to provide a path of a desired dimension to reduce electromagnetic interference (EMI) leakage.

11. A rotary joint comprising:
a power transfer interface for transferring power between a first portion having a first magnetic core and a second portion having a second magnetic core, wherein the second magnetic core is rotatable relative to the first portion; and
a fiber optic interface for transferring data between a first fiber optic portion and a second fiber optic portion that is rotatable relative to the first fiber optic portion, the fiber optic interface comprising a biasing mechanism and a lock member, wherein the biasing mechanism is configured to bias at least one of the first fiber optic portion or the second fiber optic portion toward the other of the first fiber optic portion or the second fiber optic portion, wherein the lock member is coupled to the second fiber optic portion and extends into one or more recesses in the second magnetic core, wherein the locking member is configured to engage the second magnetic core to rotate the second portion relative to the first portion.

12. The rotary joint of claim 11 further comprising a spacer located between the first magnetic core and the second magnetic core.

13. The rotary joint of claim 12 wherein the spacer comprises a non-conductive, low friction material.

14. The rotary joint of claim 13 wherein the low friction material comprises mylar or Teflon.

15. The rotary joint of claim 12 wherein at least one of the first magnetic core or the second magnetic core comprise a projection toward the other of the first magnetic core and the second magnetic core to retain the spacer.

16. The rotary joint of claim 12 wherein both of the first magnetic core and the second magnetic core comprise a projection toward the other of the first magnetic core and the second magnetic core to retain the spacer.

17. The rotary joint of claim 11 further comprising a first housing and a resin to at least partially encapsulate the first fiber optic portion and the first magnetic core, and further comprising a second housing and resin to at least partially encapsulate the second fiber optic portion and the second magnetic core, wherein the first housing includes a flange and the second housing includes a channel to receive the flange to provide a path of a desired dimension to reduce electromagnetic interference (EMI) leakage.

18. A radar system comprising:
an antenna mounting apparatus;
an antenna rotatably coupled to the mounting apparatus by at least one rotary joint, the rotary joint comprising:
a data interface for transferring data between a first cable and a second cable that is rotatable relative to the first cable; and
a power transfer interface for transferring power between a first magnetic core and a second magnetic core that is rotatable relative to the first magnetic core and spaced apart from the first magnetic core.

19. The radar system of claim 18 further comprising a biasing mechanism configured to bias at least one of the first cable or the second cable toward the other of the first cable or the second cable, and a lock member coupled to the second cable and extending into one or more recesses in the second magnetic core.

20. The radar system of claim 18 further comprising a spacer located between the first magnetic core and the second magnetic core and made from a non-conductive, low friction material.

* * * * *